(12) United States Patent
Braun et al.

(10) Patent No.: US 7,102,755 B1
(45) Date of Patent: Sep. 5, 2006

(54) METHOD FOR DETERMINING POWER OF MODULATED SIGNALS FROM A FREQUENCY TRANSFORMED INTERFEROGRAM

(75) Inventors: David M Braun, Santa Rosa, CA (US); Misty J Mesel, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 957 days.

(21) Appl. No.: 10/080,845

(22) Filed: Feb. 22, 2002

(51) Int. Cl.
*G01B 9/02* (2006.01)
*H04J 1/16* (2006.01)

(52) U.S. Cl. .................. 356/450; 370/210; 356/484; 359/246; 359/278; 250/250

(58) Field of Classification Search .............. None
See application file for complete search history.

(56) References Cited

U.S. PATENT DOCUMENTS

| | | | | |
|---|---|---|---|---|
| 5,422,721 A | * | 6/1995 | Ryan | 356/451 |
| 5,757,488 A | * | 5/1998 | Melton et al. | 356/451 |
| 6,784,428 B1 | * | 8/2004 | Rabolt et al. | 250/339.02 |
| 6,943,871 B1 | * | 9/2005 | Abedin | 356/73.1 |

FOREIGN PATENT DOCUMENTS

EP 91301215.9 * 8/2001

OTHER PUBLICATIONS

Christian Hentschel, Joachim Vobis, Loren Stokes, Paul Hernday, Val McOmber, Douglas M. Baney, Wayne V. Sorin, Josef Beller, Christopher M. Miller, Stephen W. Hinch—"Fiber Optic Test And Measurement", Chapter 4, pp. 131-143; ISBN 0-13-534330-5, Edited by Dennis Derickson; 1998 Prentice-Hall, Inc., Upper Saddle River, New Jersey 07458.

* cited by examiner

*Primary Examiner*—Chi Pham
*Assistant Examiner*—Justin M Philpott
(74) *Attorney, Agent, or Firm*—John L. Imperato (57) ABSTRACT

A method determines power of a modulated signal that is applied to a wavelength meter by summing bin values within a designated bin range of a frequency transformed interferogram representing the modulated signal and provided by the wavelength meter. In a first embodiment of the method, the bin range within which the bin values are summed is designated by mapping a series of signal characteristics indicative of the types of the modulated signals applied to the wavelength meter, to a series of bin spans within the frequency transformed interferograms that represent the modulated signals. The method then enables a selection of a signal characteristic from the series of signal characteristics to identify the modulated signal that is applied to the wavelength meter. In response to a selection, the bin values are summed within a bin range that is consistent with the mapping of the series of signal characteristics to the series of bin spans and that is positioned about a center bin of the frequency transformed interferogram. In a second embodiment of the method, the bin range within which bin values are summed is designated automatically based on attributes of the frequency transformed interferogram.

13 Claims, 4 Drawing Sheets

METHOD FOR DETERMINING POWER OF MODULATED SIGNALS FROM A FREQUENCY TRANSFORMED INTERFEROGRAM

BACKGROUND OF THE INVENTION

Modern optical communication systems, such as dense wavelength division multiplexed (DWDM) systems, transmit data and voice traffic using multiple channels, each at a distinct wavelength or frequency of light. Typically, the multiple channels are spaced at 100 GHz, 50 GHz, 25 GHz, or 12.5 GHz across a frequency or wavelength range that is defined by optical components, such as erbium doped fiber amplifiers (EDFAs) included in the optical communication system.

Network equipment manufacturers and service providers for these optical communication systems measure wavelength and power of optical signals within the multiple channels to monitor the system performance. Since wavelength meters are typically used to monitor wavelength of these optical signals, it would be convenient to adapt the wavelength meters to also measure power of these optical signals. Prior art power measurement methods using wavelength meters provide inaccurate power measurements when the optical signals are modulated, as the optical signals are in the DWDM and other types of systems.

SUMMARY OF THE INVENTION

A method constructed according to the embodiments of the present invention determines power of a modulated signal that is applied to a wavelength meter by summing bin values within a designated bin range of a frequency transformed interferogram representing the modulated signal and provided by the wavelength meter. In a first embodiment of the method, the bin range within which the bin values are summed is designated by mapping a series of signal characteristics indicative of the types of the modulated signals applied to the wavelength meter, to a series of bin spans within the frequency transformed interferograms that represent the modulated signals. The method then enables a selection of a signal characteristic from the series of signal characteristics to identify the modulated signal that is applied to the wavelength meter. In response to a selection, the bin values are summed within a bin range that is consistent with the mapping of the series of signal characteristics to the series of bin spans and that is positioned about a center bin of the frequency transformed interferogram. In a second embodiment of the method, the bin range within which bin values are summed is designated automatically based on attributes of the frequency transformed interferogram assessed by the wavelength meter.

DETAILED DESCRIPTION OF THE EMBODIMENTS

Figure 1:
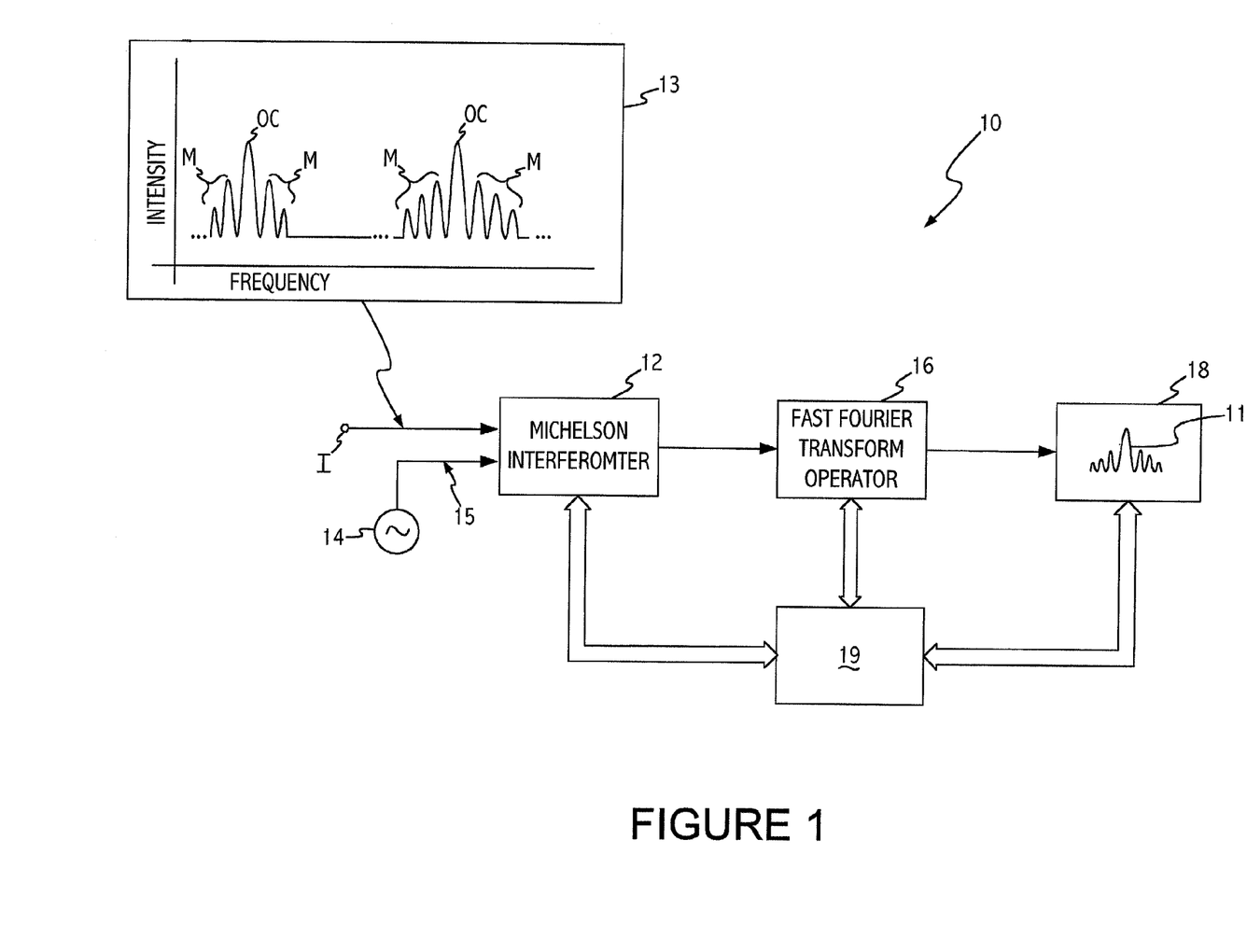
FIG. 1 shows a diagram of a wavelength meter providing a frequency domain interferogram for use with the method for determining power of a modulated signal, constructed according to the embodiments of the present invention.

FIG. 1 is a diagram of a wavelength meter 10 that provides a frequency transformed interferogram 11, used in the method 30 (shown in FIG. 3) for determining power of modulated signals 13, constructed according to the embodiments of the present invention. The modulated signal 13 includes optical carrier signals OC and modulation M, and is applied to an input I of the wavelength meter 10. A Michelson interferometer 12 within the wavelength meter 10 receives the modulated signal 13 and a reference signal 15 from a reference source 14, and provides an interferogram (not shown) that is sampled and then frequency transformed by a Fast Fourier Transform (FFT) operator 16. The FFT operator 16 produces the frequency transformed interferogram 11 that is presented on an output device, such as a display 18. A processor 19 provides for operation and control of the Michelson interferometer 12, the FFT operator 16, and the display 18.

One example of the wavelength meter 10 is an AGILENT TECHNOLOGIES, INC. model 86122A Multi-Wavelength Meter. However, any other type of wavelength meter 10 suitable for providing the frequency transformed interferogram 11 that represents the modulated signal 13 is alternatively used. Operation of wavelength meters, such as the wavelength meter 10, is also described in *Fiber Optic Test And Measurement*, Chapter 4, pages 131–143, ISBN 0-13-534330-5, edited by Dennis Derickson.

Figure 2A:
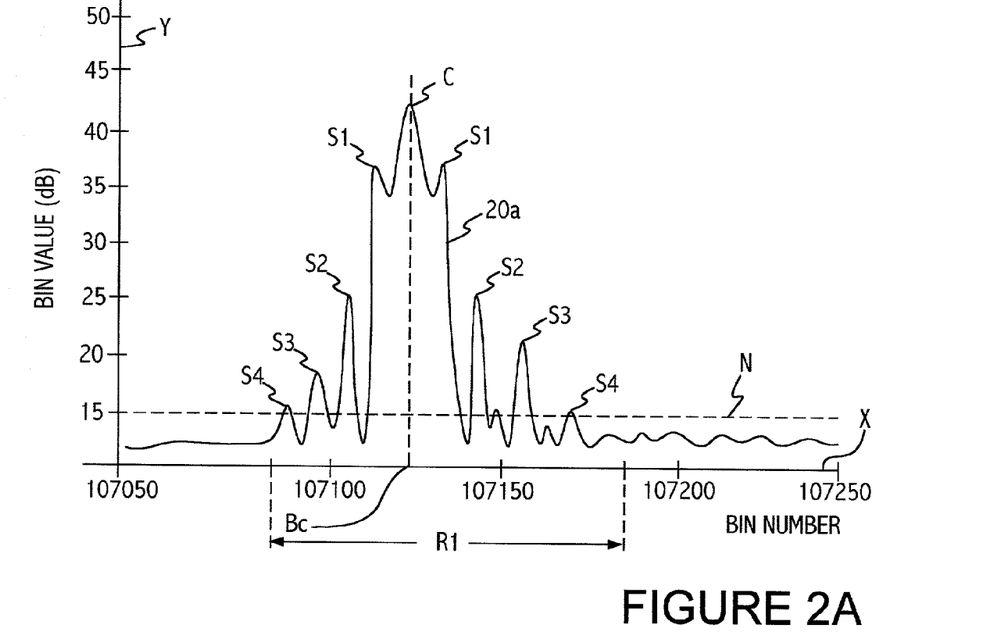
FIGS. 2A–2B show examples of frequency domain interferograms provided by the wavelength meter shown in FIG. 1.
Figure 2B:
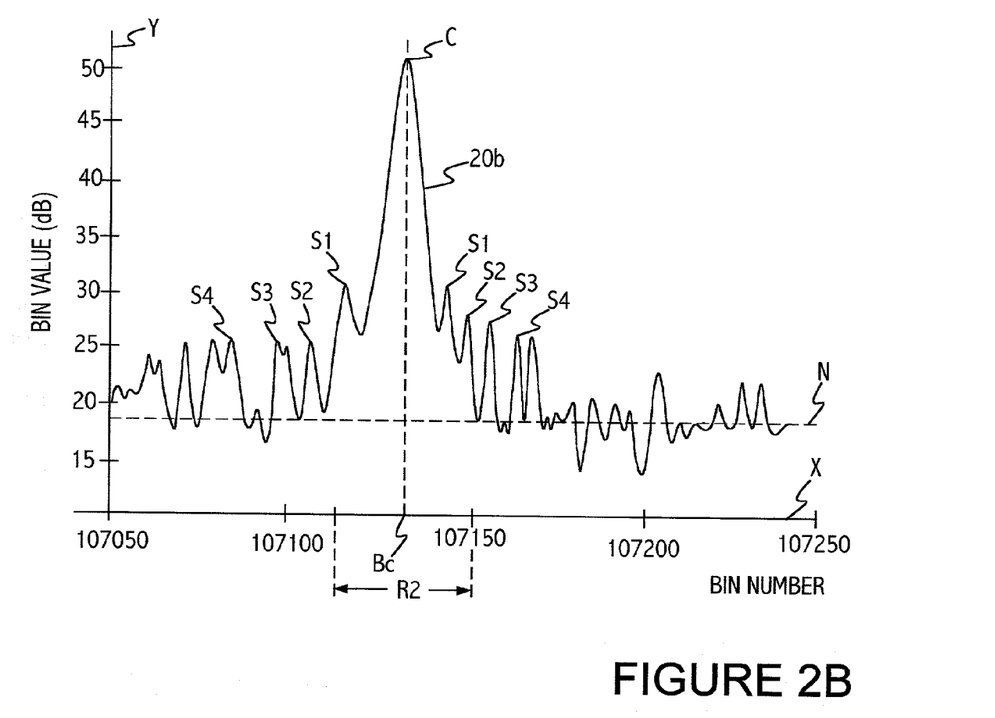

FIGS. 2A–2B show examples of the frequency transformed interferogram 11 provided by the wavelength meter 10. The frequency transformed interferogram 11 shown in FIG. 1 is referenced as frequency transformed interferogram 20a in FIG. 2A and referenced as frequency transformed interferogram 20b in FIG. 2B. The frequency transformed interferogram 20a in FIG. 2A provides a discrete representation of the optical carrier signal OC of the modulated signal 13 with modulation M at a 10 Gbit/second modulation rate in a return-to-zero (RZ) signal format. The frequency transformed interferogram 20b in FIG. 2B provides a discrete representation of the optical carrier signal of the modulated signal 13 with modulation M at a 10 Gbit/second modulation rate in a non-return-to-zero (NRZ) signal format. The discrete representations are in the form of frequency bins that results from the sampling of the interferogram provided by the Michelson interferometer 12, and the frequency transformation of the interferogram into the frequency transformed interferograms 20a, 20b by the FFT operator 16 shown in FIG. 1. A Laplace transform, Hilbert transform or other type of frequency transform is used as an alternative to the Fast Fourier Transform performed by the FFT operator 16, to provide the frequency transformed interferograms 20a, 20b.

A horizontal axis X of the frequency transformed interferograms 20a, 20b indicates adjacent frequency bins designated by consecutive bin numbers. In FIGS. 2A–2B, bin numbers 107,050 through 107,250 are shown. The bin numbers of the frequency bins in the frequency transformed interferograms 20a, 20b provided by the wavelength meter 10 represent the frequencies or wavelengths of the modulated signal 13. A vertical axis Y of the frequency transformed interferograms 20a, 20b depicts bin values that indicate the amplitude of the frequency transformed interferograms within each of the frequency bins. The bin values represent the intensity of the modulated signal 13 at the frequencies or wavelengths represented by the frequency bins. The bin values are shown on a logarithmic scale to accommodate the dynamic range of a carrier C and sidebands S1–S4 of the frequency transformed interferograms 20a, 20b, representing the optical carrier signals OC and modulation M, respectively, of the modulated signal 13. A noise floor N of the frequency transformed interferograms 20a, 20b is also indicated in FIGS. 2A–2B.

Figure 3:
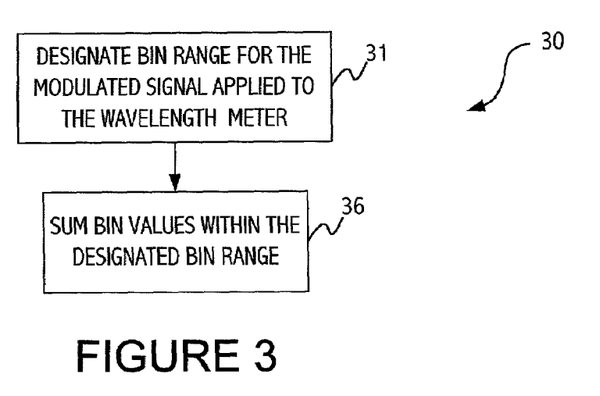
FIG. 3 is a flow diagram of the method for determining power of the modulated signal represented by the frequency domain interferogram, constructed according to the embodiments of the present invention.

FIG. 3 is flow diagram of the method 30, constructed according to the embodiments of the present invention, for determining power of the modulated signal 13 applied to the wavelength meter 10 from the frequency domain interferogram 11 provided by the wavelength meter 10. The processor 19, or a computer, microprocessor or other device internal or external to the wavelength meter 10, having access to the bin values and the bin numbers of the frequency transformed interferograms 11, and having capability to execute instructions according to the flow diagram of the method 30, is used to implement the method 30.

Determining power of the modulated signal 13 according to the method 30 includes summing the bin values within the frequency bins that have bin numbers spanning a designated bin range (step 36), for example, the bin ranges R1, R2. The bin range within which the bin values are summed in step 36, is designated for the modulated signal 13 applied to the wavelength meter 10 in step 31. The designated bin ranges include the appropriate frequency bins within the frequency transformed interferogram 11, to result in the summation in step 36 being an accurate determination of the power of the modulated signal 13 represented by the frequency transformed interferogram 11. As examples, the bin range R1 of the frequency transformed interferogram 20a shown in FIG. 2A extends from bin number 107080 to bin number 107175 and has a bin span of 96 frequency bins, while the bin range R2 of the frequency transformed interferogram 20b shown in FIG. 2B extends from bin number 107120 to bin number 107150 and has a bin span of 31 frequency bins.

Figure 4:
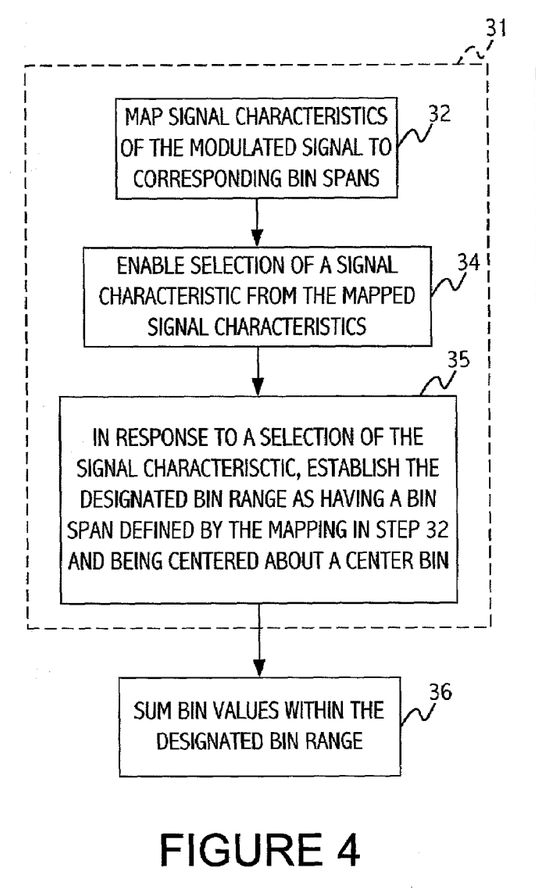
FIG. 4 is a flow diagram of the method for determining power of the modulated signal represented by the frequency domain interferogram, constructed according to a first embodiment of the present invention.

According to a first embodiment of the present invention shown in FIG. 4, the bin range is designated by mapping signal characteristics indicative of the various types of modulated signals 13 to corresponding bin spans within the frequency transformed interferograms 11 representing the types of modulated signal 13 (step 32), by enabling a selection of one of the signal characteristics (step 34), and in response to selection of the signal characteristic, establishing the designated bin range as having a bin span defined by the mapping of step 32, and being centered about a center bin $B_C$ within the frequency transformed interferogram.

Typically, the signal characteristics that are mapped to the bin spans in step 32 include modulation formats of the modulated signal 13 that identify the modulation rate of the modulation M of the modulated signal 13 and identify whether RZ signal format or NRZ signal format is present in the modulated signal 13. Alternatively, the signal characteristics that are mapped to the bin spans in step 32 include the channel spacing of the optical carrier signals OC of the modulated signal 13 or include a designated frequency or wavelength span sufficiently broad to encompass the modulation M of the modulated signal 13. While examples of signal characteristics are presented, various other signal characteristics indicative of the types of the modulated signals 13, are suitable for mapping to bin spans of the frequency transformed interferograms according to step 32.

The mapping performed in step 32 is stored in a memory or other storage element (not shown), in a table or vector that relates each signal characteristics of the modulated signal 13 to a corresponding bin span. For example, the 10 Gbit/second modulation rate with the RZ signal format is related to the bin span of 96 frequency bins, whereas the 10 Gbit/second modulation rate with the NRZ signal format is related to the bin span of 31 frequency bins. The designated frequency or wavelength spans are mapped to bin span that are determined by the frequency width of each of the frequency bins provided by the wavelength meter 10. For example, a designated frequency span of 23.4 GHz is mapped to a bin span of 13 frequency bins when the frequency width of each of the frequency bins of the frequency transformed interferogram 11 provided by the wavelength meter 10 is 1.8 GHz.

As an alternative to a table or vector, the mapping performed in step 32 is represented by an equation or other relationship that relates the signal characteristics of the modulated signal 13 to the bin spans. For example, when the mapped signal characteristic is the channel spacing between the optical carrier signals OC of the modulated signal 13, the bin span is designated by percentages of the total number of frequency bins, or the bin spacing, between the carriers C of the frequency transformed interferogram representing the modulated signal 13.

The bin range within which bin values are summed in step 36, includes the mapped bin span resulting from step 32, centered about the center bin $B_C$ of the frequency transformed interferogram that includes the carrier C (shown in FIGS. 2A–2B). The center bin $B_C$ is identified in step 35 as the frequency bin having a peak, or highest bin value. The center bin $B_C$ is alternatively identified as a frequency bin that is equidistant from the paired sidebands represented in the frequency transformed interferograms, such as the sidebands S1–S4 of the frequency transformed interferograms 20a, 20b shown in FIGS. 2A–2B, respectively. The center bin $B_C$ can also be identified in step 35 manually, by a user-entered frequency, wavelength or bin number, or automatically by any other known techniques used by wavelength meters, such as the wavelength meter 10, to determine the frequency or wavelength of optical carrier signals OC.

A first alternative implementation of step 32 establishes the mapping of signal characteristics to bin spans empirically. First, power measurements are performed on modulated signals 13 that have signal characteristics of the modulated signals 13 that are applied to the wavelength meter 10. These power measurements are performed using an optical power meter, optical spectrum analyzer, or other measurement system capable of accurately measuring optical power of the modulated signals 13. Then, the modulated signals 13 are applied to the wavelength meter 10 that provides frequency transformed interferograms that represent the applied modulated signals 13. Bin values within the frequency bins of the frequency transformed interferogram are then summed over incrementally increasing bin spans, centered about the center bin BC, to identify the bin span over which the summation of the bin values most closely represents the measured powers of the modulated signal 13. This identified bin span is used in the mapping of the signal characteristics to corresponding bin spans.

A second alternative implementation of step 32 establishes the mapping of the signal characteristics to the bin spans according to computer simulations. First, an expected power level is computed or otherwise determined for the modulated signals 13 having the various signal characteristics of the modulated signals 13 that are applied to the wavelength meter 10. For example, the modulated signal 13 having a 10 Gbit/second modulation rate with a RZ signal format and a 50% duty cycle, has an expected power level that is 6.02 dB lower than the power level of the optical carrier signal OC in the absence of modulation M, since this modulated signal 13 has data bits, half of which on average, are of logic one level. The expected power level for the modulated signals 13 having other of the signal characteristics is similarly determined.

Once the expected power level is determined, a simulated frequency transformed interferogram is provided by a computer simulation of the wavelength meter 10, that results in a simulated frequency transformed interferogram representing each of the modulated signals 13. Computational programs, such as MATLAB, from The Math Works, Inc. Natick, Mass., can be used to model and sample the interferogram as provided by the Michelson interferometer 12 within the wavelength meter 10, and then perform the frequency transform as provided by the FFT operator 16 of the wavelength meter 10, to provide the simulated frequency transformed interferogram. An example of MATLAB commands suitable for providing the simulated frequency transformed interferogram is presented in an APPENDIX. The center bin $B_C$ of the simulated frequency transformed interferogram, representing the optical carrier signals OC of the modulated signal 13, is identified and bin values within the frequency bins of the simulated frequency transformed interferogram are then summed across incrementally increasing bin spans to identify the bin span over which the summation of bin values most closely represents the expected power level. This identified bin span is used in the mapping of the signal characteristics to corresponding bin spans.

While the mapping of the signal characteristics of the modulated signal 13 to the bin spans of the frequency transformed interferograms representing the modulated signal 13 is described as being established empirically and via computer simulation, the mapping of step 32 is alternatively established by any other technique suitable to relate the bin spans to the signal characteristics of the modulated signals 13, so that the summation of the bin values within the designated bin range in step 36 results in the determination of the power of the modulated signals 13 to a predetermined accuracy.

Figure 6:
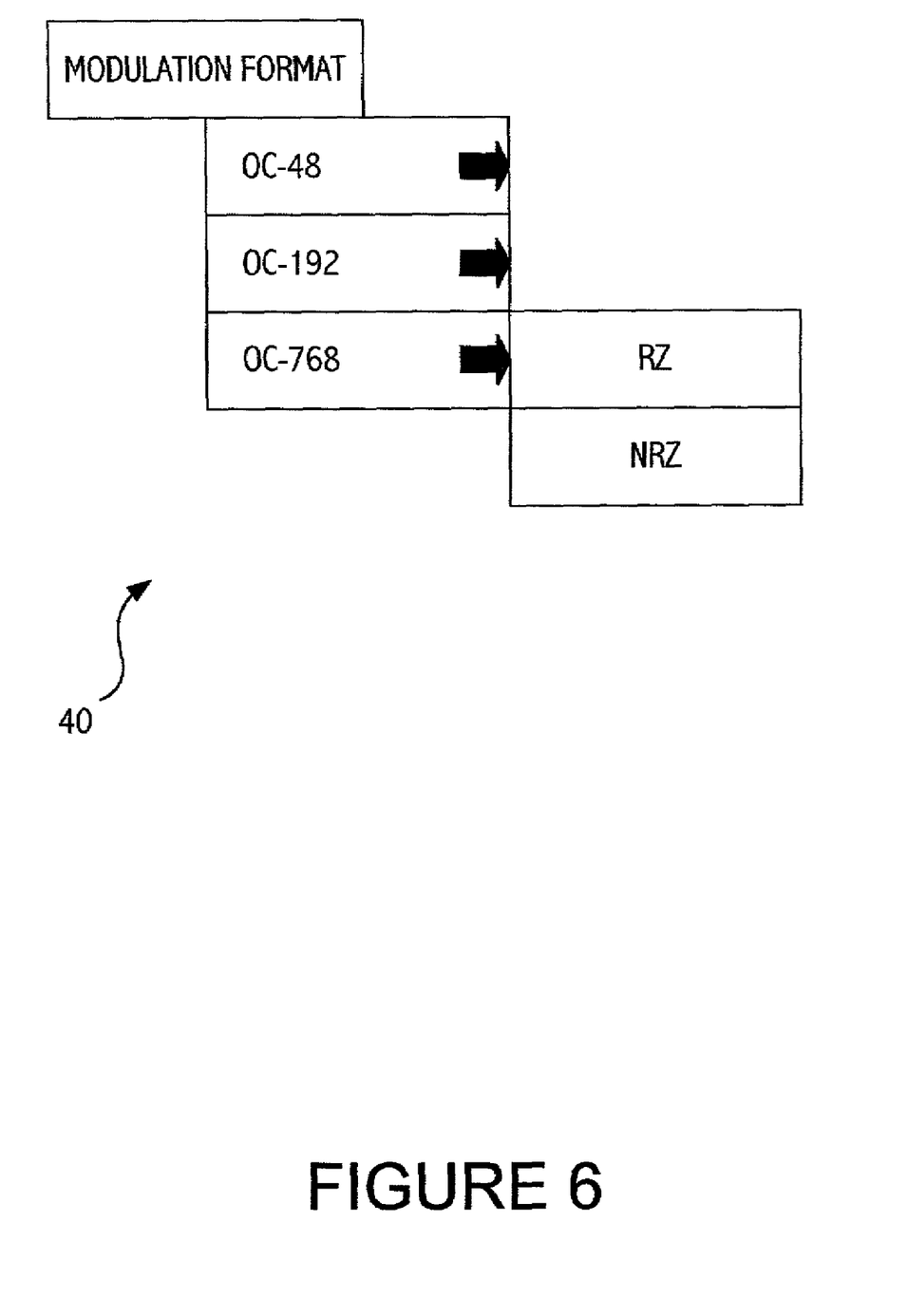
FIG. 6 shows an example of a display menu optionally included in the method shown in FIGS. 3–4.

In step 34 of the method 30, selection of a signal characteristic from the series of signal characteristics mapped to bin spans in step 32, is enabled. In a first implementation of step 34, a choice of signal characteristics suitable to identify the various types of modulated signals 13 applied to the input I of the wavelength meter 10 is presented. This enables a user of the wavelength meter 10 to select the signal characteristic that identifies the type of the applied modulated signal 13. FIG. 6 shows a display menu 40, optionally included in the method 30, for presenting the choice of the signal characteristics, enabling the selection of step 34. The display menu 40 in this example includes multiple modulation formats wherein the modulation rates 2.488 Gbit/second, 9.952 Gbit/second and 39.8 Gbit/second are indicated by the format standards OC-48, OC-192, OC-768 respectively. Each of the modulation rates present in the display menu 40 has a sub-menu indicating the alternative RZ and NRZ signal formats. The display menu 40 is presented in response to instructions from the processor 19, or from an external computer (not shown) or other device suitable for presenting menus on an output device, such as the display 18 of the wavelength meter 10 shown in FIG. 1. A user of the wavelength meter 10 can select the signal characteristic from the display menu 40 to identify the modulated signal 13 that is applied to the wavelength meter 10 via a mouse, trackball, touch pad, touch screen, cursor key, or other pointing device. As an alternative to the display menu 40 shown in FIG. 6, selection of the signal characteristic is enabled in step 34 by providing a user of the wavelength meter 10 the ability to enter the signal characteristic of the modulated signal 13 using keystrokes to a front panel (not shown) of the wavelength meter 10. Selection of the signal characteristic according to step 34 is alternatively enabled using a remote interface coupled to the wavelength meter 10 via a LAN (local area network), GPIB (general purpose interface bus) or other type of communication link.

Alternatively, the selection of the signal characteristic enabled in step 34 is performed automatically based on attributes of the frequency transformed interferograms provided by the wavelength meter 10. Since the bin values and bin numbers of the carrier C and the sidebands S1–S4 of the frequency transformed interferogram represent the intensity and wavelengths of the optical carrier signal OC and the modulation M, respectively, of the modulated signal 13 applied to the wavelength meter 10, the processor 19, computer, microprocessor or other device, internal or external to the wavelength meter 10 that has access to the bin values and the bin numbers, can determine the modulation rate of the modulated signal 13, determine whether the modulated signal 13 has the RZ signal format or the NRZ signal format, or determine the wavelength or frequency spacing of the optical carrier signals OC of the applied modulated signal 13. This determination sufficiently identifies the signal characteristic of the applied modulated signal 13, enabling the signal characteristic of the modulated signal 13 to be automatically selected, so that the mapping established in step 32 can be used to designate the bin range used in the summation in step 36 of the method 30.

Figure 5:
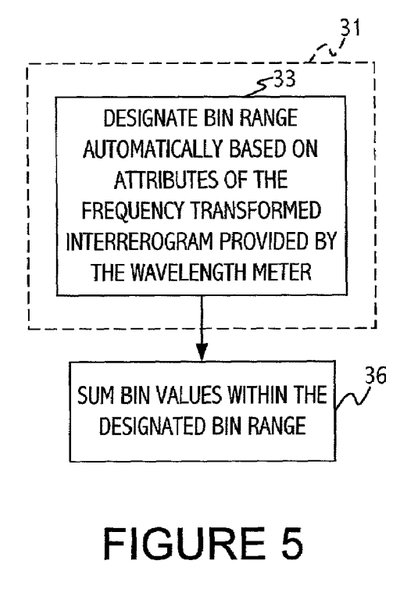
FIG. 5 is a flow diagram of the method for determining power of the modulated signal represented by the frequency domain interferogram, constructed according to a second embodiment of the present invention.

According to a second embodiment of the present invention, as an alternative to designating the bin range by the mapping of signal characteristics to bin spans as in step 32 and the selection enabled in step 34, the bin range is designated automatically based on attributes of the frequency transformed interferograms provided by the wavelength meter 10, as shown in step 33 of FIG. 5. The processor 19, computer, microprocessor or other device, internal or external to the wavelength meter 10 that has access to the bin values and the bin numbers of the frequency transformed interferogram 11, can designate the bin range to be centered about the center bin $B_C$ and to have a bin span that spans a sufficient number of frequency bins on each side of the center bin $B_C$ to include a predesignated number of sidebands S1–S4 on each side of the center bin BC. Alternatively, the processor 19, computer, microprocessor or other device, internal or external to the wavelength meter 10 that has access to the bin values and the bin numbers, can designate the bin range to be centered about the center bin $B_C$ of the frequency transformed interferogram and to have a bin span that spans a sufficient number of frequency bins on each side of the center bin BC, so that any bin span wider than this bin span has bin values that do not exceed a designated threshold, such as the noise floor N of the frequency transformed interferogram.

The bin values of the frequency bins within the designated bin range are summed in step 36 of the method 30 to determine the power of the modulated signal 13 represented by the frequency transformed interferogram. The bin values are typically converted from logarithmic values, as indicated in the examples of FIGS. 2A–2B, to linear values for the summation of step 36. The bin values are optionally corrected for the noise floor N of the frequency transformed interferograms by subtracting the noise component in each frequency bin within the bin range. The sum of bin values resulting in step 36 can also be corrected for apodization that is typically applied to the frequency transformed interferogram provided by the FFT operator 16 or to the interferogram (not shown) provided by the Michelson interferometer 12. A typical correction for apodization includes dividing the sum of bin values resulting in step 36 by two.

While the embodiments of the present invention have been illustrated in detail, it should be apparent that modifications and adaptations to these embodiments may occur to one skilled in the art without departing from the scope of the present invention as set forth in the following claims.

APPENDIX

```
%
% This is for:
% RZ, 1 10Gbit/s, square wave, 50% duty cycle, random data sequence of
18 bits/sample
%
clear
format compact
format short
p=1:2^18;
centerwavel=1549.946135748;
fHeNe=473.6127*10^12;
splight=3.0*10^8;
stepinc=((splight)/fHeNe)*10^9;
timed(p)=(1.0000+sin((stepinc/centerwavel)*2.000000*pi*(p)))/2;
modulationfunctionac(p)=0;
modulationfunctiondc(p)=0;
%
% Generate a full "one" in RZ format
%
fmodulation=10*10^9;
modwavel=10^9*splight/fmodulation;
totalwidth=fix(modwavel/stepinc);
if totalwidth/2>fix(totalwidth/2)
    totalwidth=totalwidth+1;
end
r=1:totalwidth/2;
michelsondcp(r)=0;
michelsonacp(r)=0;
for k=1:totalwidth/2
    michelsonacp(k)=(totalwidth/2-k)/(totalwidth/2);
    michelsondcp(k)=k*.5/(totalwidth/2);
end
sections=fix((131072-totalwidth/2)/totalwidth);
for i=-sections:sections
    modulationfunctionac(i*totalwidth+131072)=1;
    for k=1:totalwidth/2
        modulationfunctiondc(k+i*totalwidth+131072)=
        michelsondcp(k);
        modulationfunctionac(k+i*totalwidth+131072)=
        michelsonacp(k);
        modulationfunctiondc(-k+i*totalwidth+131072)=
        michelsondcp(k);
        modulationfunctionac(-k+i*totalwidth+131072)=
        michelsonacp(k);
    end
end
if 131072+(sections+1)*totalwidth<262144
    modulationfunctionac((sections+1)*totalwidth+131072)=1;
    modulationfunctionac(131072-(sections+1)*totalwidth)=1;
    for k=1:totalwidth/2
        modulationfunctiondc(-k+(sections+1)*totalwidth+131072)=
        michelsondcp(k);
        modulationfunctionac(-k+(sections+1)*totalwidth+131072)=
        michelsonacp(k);
```

APPENDIX-continued

```
        modulationfunctiondc(131072+k-(sections+1)*totalwidth)=
        michelsondcp(k);
        modulationfunctionac(131072+k-(sections+1)*totalwidth)=
        michelsonacp(k);
    end
    for k=131072+(sections+1)*totalwidth:262144
        modulationfunctiondc(k)=michelsondcp(k-(131072+
        (sections+1)*totalwidth)+1);
        modulationfunctionac(k)=michelsonacp(k-(131072+
        (sections+1)*totalwidth)+1);
    end
    for k=1:131072-(totalwidth/2+(sections+.5)*totalwidth)
        modulationfunctiondc(k)=miohelsondcp(131072-(totalwidth/2+
        (sections+.5)*totalwidth-k));
        modulationfunctionac(k)=michelsonacp(131072-(totalwidth/2+
        (sections+.5)*totalwidth-k));
    end
else
    for k=131072+totalwidth/2+sections*totalwidth:262144
        modulationfunctiondc(k)=michelsondcp(131072+totalwidth/2+
        (sections+.5)*totalwidth-k);
        modulationfunctionac(k)=michelsonacp(131072+totalwidth/2+
        (sections+.5)*totalwidth-k);
    end
    for k=1:131072-(totalwidth/2+sections*totalwidth)
        modulationfunctiondc(k)=michelsondcp(k+totalwidth/2+
        (sections+.5)*totalwidth-131072);
        modulationfunctionac(k)=michelsonacp(k+totalwidth/2+
        (sections+.5)*totalwidth-131072);
    end
end
dconeonzero(1:262144)=.25;
%
% Generate a random sequence of ones and zeroes
%
randomnos=rand(2,262144);
randomnos=fix(randomnos*32768);
%
% Loop begins
%
for j=1:262144
digitstream=['0 0 0 0 0 0 0 0 0 0 0 0 0 0 0 0 0 0 0 0 0 0 0 0 0 0 0 0 0
0'];
a=dec2bin(randomnos(1,j));
b=dec2bin(randomnos(2,j));
strlengtha=size(a);
strlengthb=size(b);
for i=1:strlengtha(2)
    digitstream(59-2*(i-1))=a(strlengtha(2)-(i-1));
end
for i=1:strlengthb(2)
    digitstream(29-2*(i-1))=b(strlengthb(2)-(i-1));
end
numberarray=str2num(digitstream);
section=fix((abs(j-131072)+totalwidth/2)/totalwidth);
for i=1:18
    numberarray2(30-(i-1))=numberarray(30-(i-1)-section);
end
bac=sum(numberarray(13:30).*numberarray2(13:30))*
modulationfunctionac(j)*timed(j);
bdc=sum(numberarray(13:30).*numberarray2(13:30))*
modulationfunctiondc(j);
cdc=(sum(numberarray(13:30))+sum(numberarray2(13:30))-
2*sum(numberarray(13:30).*numberarray2(13:30)))*dconeonzero(j);
timed(j)=bac+bdc+cdc;
end
%
% For RZ only halftime the ones are on, and for random half the ones are
now zero and half are ones.
%
timed(p)=(timed(p)/18)/2;
%
freqd=fft(timed);
p=2:(2^18)-1;
apodize(p)=freqd(p)-.5*(freqd(p+1)+freqd(p-1));
apodmag(p)=abs(apodize(p));
logapod(p)=10*log10(apodmag(p)+1*10^-8);
figure
plot(logapod,'b','Linewidth',1)
```

APPENDIX-continued

```
axis([107050 107250 0 40])
grid on
title('RZ, 10Gbit/s, square wave, 50% duty cycle, random data sequence')
xlabel('bin number')
ylabel('bin amplitude (dB)')
```

What is claimed is:

1. A method for determining power of a modulated signal, comprising:

applying the modulated signal to a wavelength meter to provide a frequency transformed interferogram representing the modulated signal by a plurality of consecutive frequency bins, each frequency bin in the plurality of frequency bins having a corresponding bin value;

designating a bin range within the frequency transformed interferogram, wherein designating the bin range within the frequency transformed interferogram includes mapping a series of signal characteristics to a corresponding series of bin spans and enabling a selection of one signal characteristic from the series of signal characteristics, wherein in response to selection of the one signal characteristic from the series of signal characteristics establishing the designated bin range as having a bin span that corresponds to the selected one signal characteristic defined by the mapping of the series of signal characteristics to the corresponding series of bin spans, and being centered about a center bin within the frequency transformed interferogram; and summing a series of bin values within the frequency transformed interferogram over the designated bin range to provide a sum that represents the power of the modulated signal to a predetermined accuracy.

2. The method of claim 1 wherein the series of signal characteristics indicates at least one of a plurality of modulation formats for the modulated signal, a plurality of channel spacings for optical carriers of the modulated signal, and a plurality of frequency spans that encompass modulation of the modulated signal.

3. The method of claim 2 wherein the mapping of the series of signal characteristics to the corresponding series of bin spans is established empirically.

4. The method of claim 2 wherein the mapping is established according to a computer simulation of the wavelength meter providing the frequency transformed interferogram.

5. The method of claim 2 wherein enabling a selection of the one signal characteristic from the series of signal characteristics includes presenting a display menu representing the series of signal characteristics and providing for the selection of the one signal characteristic from the display menu via a pointing device.

6. The method of claim 2 wherein the selection of the one signal characteristic from the series of signal characteristics is performed automatically based on attributes of the frequency transformed interferogram representing the modulated signal.

7. The method of claim 1 wherein the mapping of the series of signal characteristics to the corresponding series of bin spans is established empirically.

8. The method of claim 1 wherein the mapping is established according to a computer simulation of the wavelength meter providing the frequency transformed interferogram.

9. The method of claim 1 wherein enabling a selection of the one signal characteristic from the series of signal characteristics includes presenting a display menu representing the series of signal characteristics and providing for the selection of the one signal characteristic from the display menu via a pointing device.

10. The method of claim 1 wherein enabling the selection of one signal characteristic from the series of signal characteristics is performed automatically based on attributes of the frequency transformed interferogram representing the modulated signal.

11. The method of claim 10 wherein performing the selection of the one signal characteristic from the series of signal characteristics automatically includes assessing bin values corresponding to multiple frequency bins within the frequency transformed interferogram to determine at least one of a modulation format of the modulated signal applied to the wavelength meter and a frequency spacing of optical carriers of the modulated signal applied to the wavelength meter.

12. A method for determining power of a modulated signal, comprising:

applying the modulated signal to a wavelength meter to provide a frequency transformed interferogram representing the modulated signal by a plurality of consecutive frequency bins, each frequency bin in the plurality of frequency bins having a corresponding bin value;

designating a bin range within the frequency transformed interferogram, wherein designating the bin range includes accessing bin values corresponding to multiple frequency bins within the frequency transformed interferogram and based on the accessed bin values establishing the bin range to be centered about a center bin within the frequency transformed interferogram and to have a bin span within the frequency transformed interferogram that includes a predesignated number of sidebands on each side of the center bin, the predesignated number of sidebands representing modulation of the modulated signal; and summing a series of bin values within the frequency transformed interferogram over the designated bin range to provide a sum that represents the power of the modulated signal to a predetermined accuracy.

13. A method for determining power of a modulated signal, comprising:

applying the modulated signal to a wavelength meter to provide a frequency transformed interferogram representing the modulated signal by a plurality of consecutive frequency bins, each frequency bin in the plurality of frequency bins having a corresponding bin value;

designating a bin range within the frequency transformed interferogram, wherein designating the bin range includes accessing bin values corresponding to multiple frequency bins within the frequency transformed intererogram and based on the accessed bin values, establishing the bin range to be centered about a center bin within the frequency transformed interferogram and to have a bin span within the frequency transformed interferogram that spans a sufficient number of frequency bins on each side of the center bin so that any bin span wider than the bin span has bin values that do not exceed a designated threshold of the frequency transformed interferogram; and summing a series of bin values within the frequency transformed interferogram over the designated bin range to provide a sum that represents the power of the modulated signal to a predetermined accuracy.

* * * * *

UNITED STATES PATENT AND TRADEMARK OFFICE
CERTIFICATE OF CORRECTION

| | | |
|---|---|---|
| PATENT NO. | : 7,102,755 B1 | |
| APPLICATION NO. | : 10/080845 | |
| DATED | : September 5, 2006 | |
| INVENTOR(S) | : Braun et al. | |

It is certified that error appears in the above-identified patent and that said Letters Patent is hereby corrected as shown below:

On the title page under item (56), in "Assistant Examiner", in column 2, line 1, after "M" insert --.--.

Column 10, line 52, in Claim 13, delete "intererogram" and insert --interferogram--, therefor.

Signed and Sealed this

Twentieth Day of February, 2007

JON W. DUDAS
*Director of the United States Patent and Trademark Office*